R. EGG.
WORM GEAR.
APPLICATION FILED APR. 25, 1917.

1,262,932.

Patented Apr. 16, 1918.

Inventor:
Rudolf Egg.
By Henry Orth
Atty.

UNITED STATES PATENT OFFICE.

RUDOLF EGG, OF ZURICH, SWITZERLAND.

WORM-GEAR.

1,262,932.   Specification of Letters Patent.   Patented Apr. 16, 1918.

Application filed April 25, 1917. Serial No. 164,520½.

*To all whom it may concern:*

Be it known that I, RUDOLF EGG, a citizen of the Republic of Switzerland, residing at Zurich, Switzerland, have invented certain new and useful Improvements in Worm-Gears; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object to provide a worm gear with ratio of transmission variable according to desire, wherein upon a shaft are slidably mounted, one behind the other, several worms with different pitches or sense of thread, and these worms may be alternately brought into engagement with a worm wheel having round rotatable teeth. The effect obtained is that the ratio of transmission or the sense of rotation transmitted from the driving to the driven shaft may be varied at will.

Figure 1:
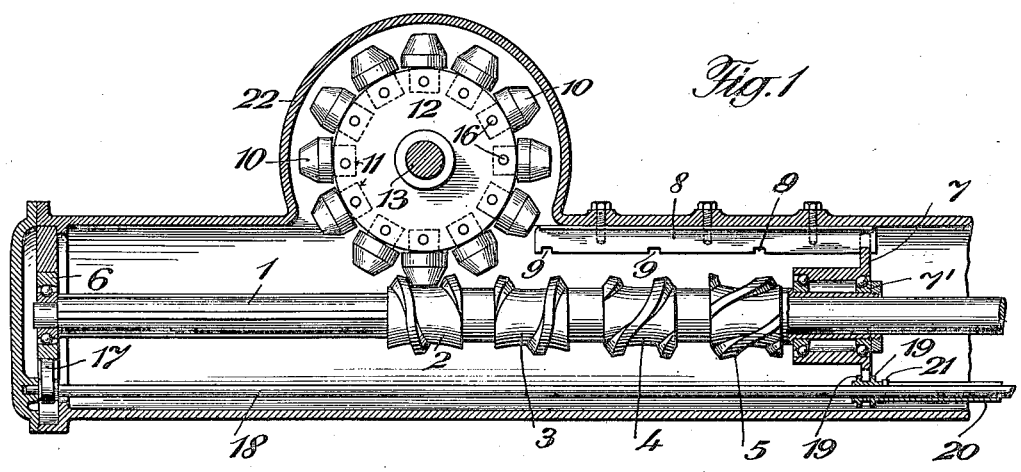
Figure 2:
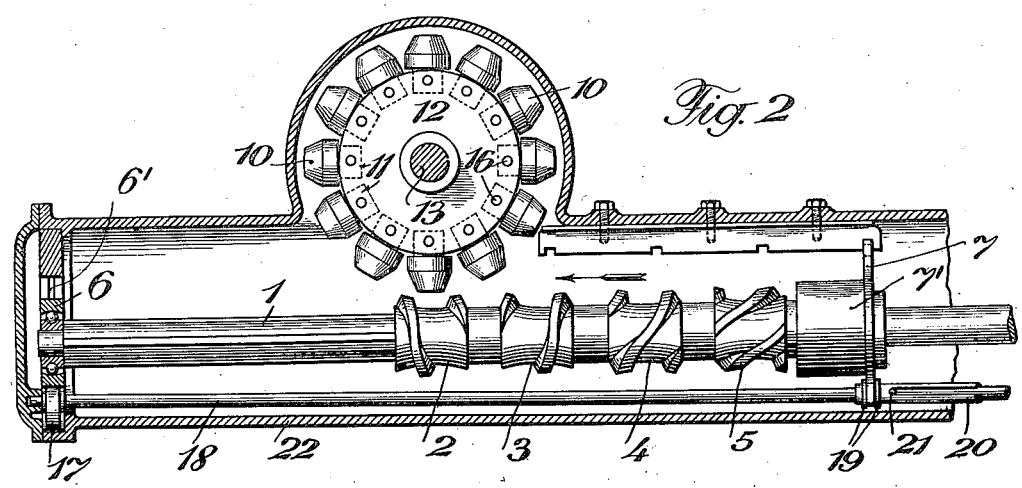
Figure 4:
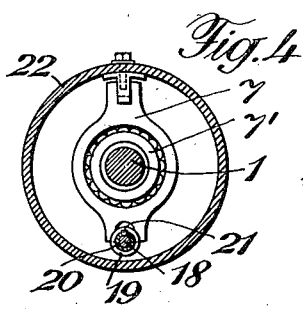
Figure 5:
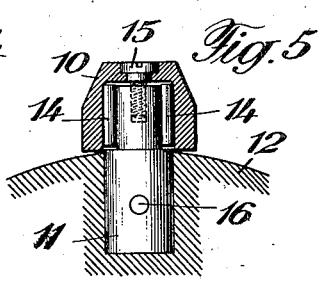
Figure 3:
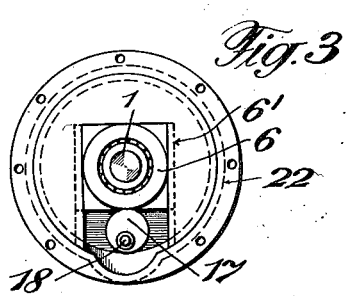

In the accompanying drawings the object of this invention is shown as applied to a construction by which three different ratios of transmission as well as reversal of rotation may be obtained, Figure 1 being a sectional view of the worm gear in working position. Fig. 2 is a sectional view of the worm gear when out of engagement. Fig. 3 shows one of the end-bearings with actuating device in end view and Fig. 4 is a cross section through the driving shaft and its casing and shows the ball bearing. Fig. 5 represents, partly in section, one of the teeth of the worm wheel on a larger scale.

1 is the driving shaft having a longitudinal groove and coupled to the engine shaft by any suitable known means. Keyed on this shaft, but free to slide along it, is a sleeve on which are securely mounted the worms 2, 3, 4 and 5. Of these, the worm 2 has a right-hand thread and serves for reversal while the worms 3, 4 and 5 are provided with left-hand threads, single, double and treble respectively. At each end, the shaft 1 is held in ball bearings of which only the left one is shown at 6 in the drawings and which may be raised and lowered between vertical guides 6'. A box 7 is connected with the worm sleeve by ball bearings 7' in such a manner as to follow any axial displacement of said sleeve without participating in its rotation. This box 7 now serves for adjusting and locking the worm sleeve in position by engagement with notches 9 arranged in a fixed guiding bar 8, each of which notches 9 corresponds to the working position in front of the worm wheel of one of the worms 2 to 5. Keyed upon the shaft 13 is the worm wheel 12 which carries pins 11, and the round teeth 10 are loose and rotatable upon these pins, rollers 14 being interposed between the latter and the bore of the teeth which are held in position by set screws 15. Holes are provided in the tail ends of the pins 11 and through these locking pins 16 are passed to secure said pins in the worm wheel body. Fast on the rod 18 are two eccentrics one of which is shown at 17 and which serve to raise the shaft 1 from the position which it is seen to occupy in Fig. 2 to that of Fig. 1. The rod 18 is partly inclosed by a carrier sleeve 20 having collars 19 which serve to engage corresponding projections in the ball bearing box 7. Fast on the rod 18 and engaging a slot provided in the carrier sleeve 20 is a projecting pin 21 which will cause the sleeve 20 to rotate whenever the carrier sleeve is rotated.

Inclosing the whole gearing is a casing 22 which at the same time serves as a recipient for the lubricating oil.

The mechanism illustrated operates in the following manner:

Shaft 1 is being driven in any known manner by the engine and transmits rotation to the worms. According to the pitch of the particular worm which, at a given moment, is in engagement with the worm wheel, this latter will be driven in one sense or in the other or at higher or lower speed.

Means not shown in the drawings but well known in the trade, such as sliding levers as used in automobile steering gear, are provided so that the carrier sleeve 20 may be either rotated or slide forward and backward. When it is rotated, the eccentrics 17 will lower the ball bearing 6 from its position illustrated in Fig. 1 to that shown by Fig. 2, whereby the worm shaft is disconnected from the worm wheel shaft. Then, by pushing the carrier 20 sidewise, the collars 19 will be made to act upon the projection of the ball bearing box 7, so that the entire worm sleeve is moved until the desired worm is opposite the worm wheel. The rod 18 is then turned back and the shaft 1 returns to the position shown in Fig. 1, so as to bring the worm wheel into engagement with the particular worm that is then in opposition. At the same time, an upper projection of the box 7 is engaged by the corresponding notch 9 in the bar 8 thereby securing the worm sleeve against any inadvertent displacement. Owing to the arrangement of the rollers 14, very little friction takes place when the teeth of the worm wheel rotate, and therefore, even where worms of low pitch are employed, the brake action usually experienced with worm gears does not take place with this invention. Thus it is possible to have the worm shaft driving the worm wheel shaft or driven by it according to desire. This is why in the drawings the connection of the gear to the engine has been omitted. The teeth 10 may be made to run on ball bearings instead of on rollers 14 as shown.

Owing to its high efficiency and noiseless running, the worm gear as described is especially well suited for motor vehicles and may then be directly mounted in the rear axle.

What I claim is:

1. In a worm gear, a worm wheel having symmetrical radially disposed teeth, a driving shaft, a plurality of worms of different pitch slidable on the shaft, and means to adjust the shaft laterally in a straight path to and from the axis of the worm wheel to effect engagement of the worms with the worm wheel.

2. In a worm gear, a worm wheel having symmetrical radially disposed teeth, a driving shaft, a plurality of worms of different pitch slidable on the shaft, means to slide the worms on and longitudinally of the shaft, and means to adjust the shaft laterally in a straight path to and from the axis of the worm wheel to effect engagement of the worms with the worm wheel.

3. In a worm gear, a worm wheel having radially disposed teeth, a laterally movable driving shaft, a plurality of worms of different pitch slidably mounted on the shaft, a rotatable rod, and an eccentric on the latter acting on the shaft to vary the distance of the shaft from the axis of the worm wheel.

4. In a worm gear, a worm wheel having teeth rotatably mounted on radially disposed axes, a laterally movable shaft, a sleeve slidable on and rotatable with the shaft, a plurality of worms of different pitch fast on the sleeve, a slidable bearing for the shaft, a rotatable rod, an eccentric on the latter acting on the bearing, and means to lock the sleeve against displacement on the shaft when one of the worms is in engagement with the worm wheel.

5. In a worm gear, a worm wheel having teeth rotatably mounted on radially disposed axes, a laterally movable shaft, a sleeve slidable on and rotatable with the shaft, a plurality of worms of different pitch fast on the sleeve, a slidable bearing for the shaft, a rotatable rod, an eccentric on the latter, acting on the bearing, an adjustable bearing for the sleeve axially movable therewith, and means to lock the sleeve bearing against displacement when one of the worms is in engagement with the worm wheel.

In testimony that I claim the foregoing as my invention, I have signed my name.

RUDOLF EGG.